United States Patent [19]
Sassi

[11] Patent Number: 5,160,580
[45] Date of Patent: Nov. 3, 1992

[54] PROCESS OF USING A MULTI-PURPOSE TUBE NEST EVAPORATOR

[75] Inventor: Carlo Sassi, Parma, Italy

[73] Assignee: Fenco S.p.A., Parma, Italy

[21] Appl. No.: 464,623

[22] Filed: Jan. 3, 1990

Related U.S. Application Data

[63] Continuation of Ser. No. 185,339, Apr. 21, 1988, abandoned, which is a continuation of Ser. No. 890,942, Jul. 28, 1986, abandoned.

Foreign Application Priority Data

Jul. 31, 1985 [IT] Italy .................. 40081 A/85

[51] Int. Cl.$^5$ .................... B01D 1/06; B01D 1/30
[52] U.S. Cl. .................... 159/47.1; 159/25.1; 159/27.4; 159/43.2; 159/44; 159/900; 159/901; 203/1; 203/DIG. 7; 203/DIG. 9; 203/DIG. 18; 202/197; 202/265
[58] Field of Search .................... 159/901, 900, 43.2, 159/44, 25.1, 27.4, DIG. 32, 25.2, 27.1, 47.1; 202/197, 235, 246, 259, 262, 265; 203/1, DIG. 7, DIG. 9, DIG. 18, 98, 94

[56] References Cited

U.S. PATENT DOCUMENTS

| | | | |
|---|---|---|---|
| 2,204,497 | 6/1940 | Hunter | 159/28.2 |
| 2,655,347 | 10/1953 | Bielfeldt | 159/28.2 |
| 2,703,610 | 3/1955 | Cross | 159/13.2 |
| 3,595,299 | 7/1971 | Weishaupt et al. | 159/28.5 |
| 3,880,702 | 4/1975 | Troshenkin et al. | 159/13.2 |
| 4,202,493 | 5/1980 | Franchina | 165/901 |
| 4,329,198 | 5/1982 | Standiford | 159/13.2 |
| 4,334,961 | 6/1982 | Moen et al. | 159/2.3 |
| 4,415,407 | 11/1983 | Longuet | 159/13.2 |
| 4,427,053 | 1/1984 | Klaren | 159/13.2 |
| 4,498,308 | 2/1985 | Phillips et al. | 62/184 |
| 4,505,327 | 3/1985 | Angle et al. | 165/60 |
| 4,638,855 | 1/1987 | Elmore et al. | 165/115 |
| 4,682,474 | 7/1987 | Janke | 62/187 |
| 4,688,393 | 8/1987 | Linstromberg et al. | 62/180 |
| 4,756,164 | 7/1988 | James et al. | 165/104.11 |

OTHER PUBLICATIONS

Webster's II, New Riverside University Dictionary.

*Primary Examiner*—Virginia Manoharan

[57] ABSTRACT

An evaporating process that alternate between different modes of operation, according to the characteristics of the product handled; the product is either force fed into the tube nest, or cascaded through it in a free-falling film.

8 Claims, 2 Drawing Sheets

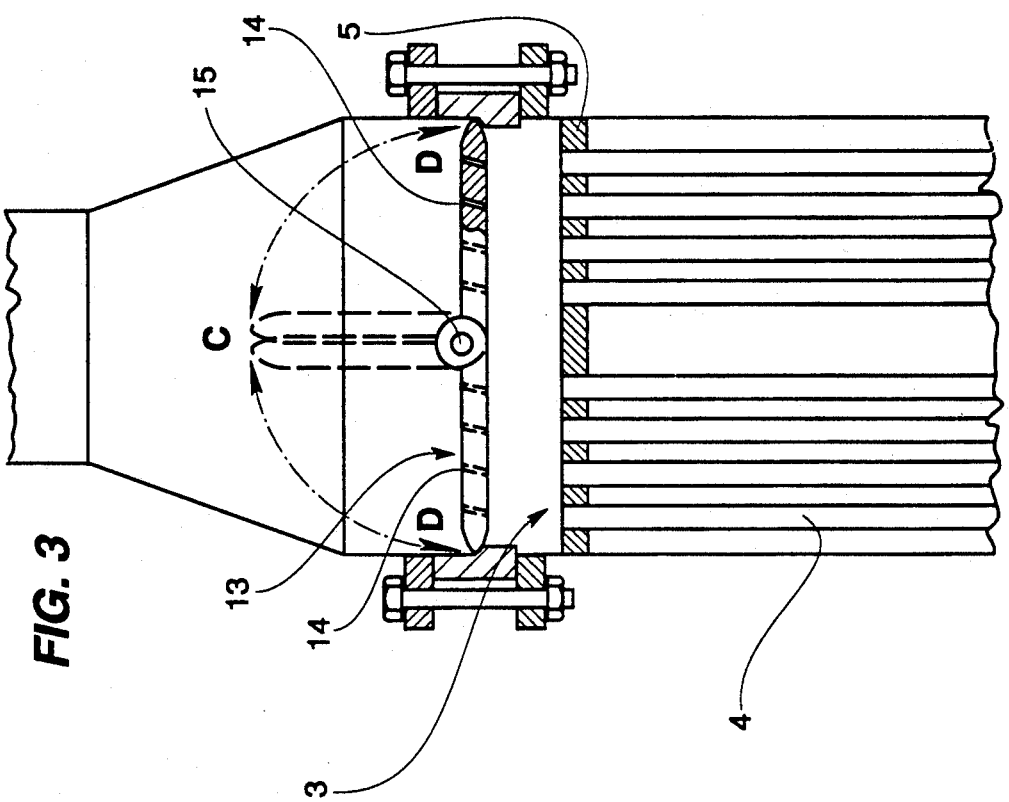
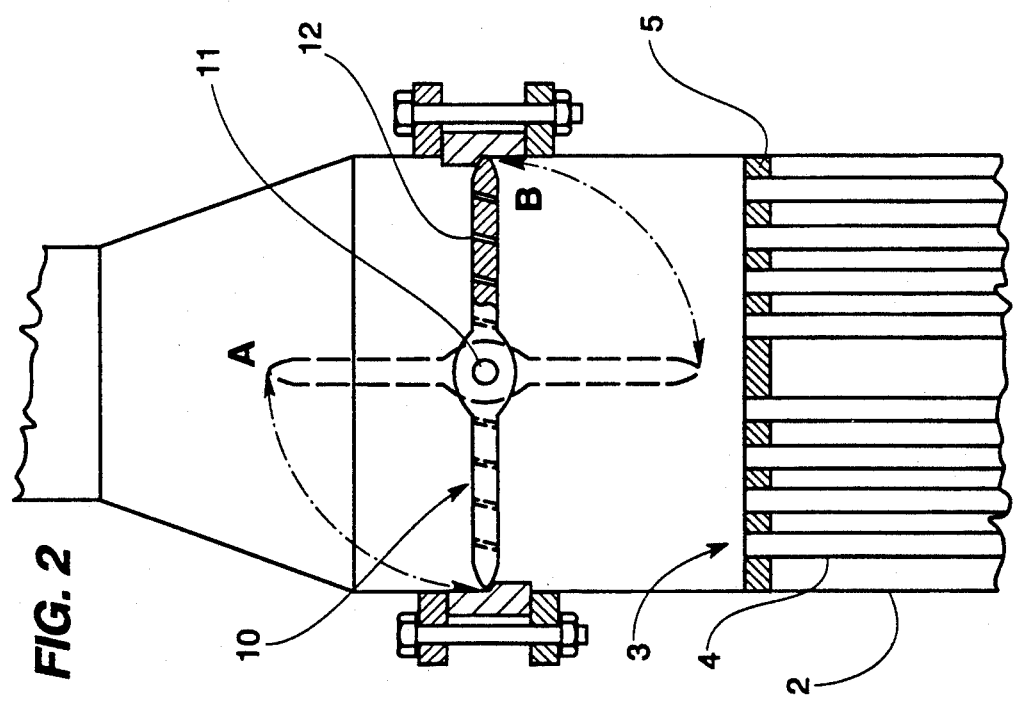

५,१६०,५८०

PROCESS OF USING A MULTI-PURPOSE TUBE NEST EVAPORATOR

This is a continuation of application Ser. No. 07/185,339 filed Apr. 21, 1988, now abandoned, which is a continuation of Ser. No. 890,942, filed Jul. 28, 1986, now also abandoned.

BACKGROUND OF THE INVENTION

The invention disclosed relates to a multi-purpose tube-nest evaporator, an item of apparatus intended specifically for use in the concentration of liquid foodstuffs (juices etc.), or of chemicals, but which might be used for any compatible purpose. The evaporators used in plant for implementing such a process will generally incorporate tube nest heat exchangers, the tubes of which are vertically disposed in most instances; the method by which a given product is fed through such an evaporator is dependent upon its degree of viscosity.

More precisely, significantly viscous fluids require forced circulation, whereas a less viscous product can be cascaded through the evaporator in a free-falling film, the advantages of which are considerable, namely: a high overall heat exchange coefficient; low power requirement as regards propulsion of the product through the tube nest; and faster throughput. Where a product is simply cascaded, in fact, the power rating of the pump installed can be drastically reduced in relation to that of a pump used to force-feed viscous products.

The requirement for an evaporation facility in which one or more stages can be utilized by turns to force-feed and cascade a product has led to the embodiment of evaporators in a multi-purpose type of design. In prior art embodiments, conversion of the evaporator to enable the switch from force-feed to cascade type operation involves, on the one hand, installation of a second pump with a capacity rating significantly lower than that of the pump utilized in force-feeding viscous products, and on the other, fitment to the inlet bulkhead of the tube nest of one or more baffles by means of which to control the flow of liquid.

The addition of such baffles to an existing evaporator is no simple matter; the baffles must be installed internally, and this necessitates shut-down of the system in order to carry out the necessary dismantling and reassembly operations.

The main object of the invention is that of overcoming the drawback described above, namely, to effect conversion quickly from a force-feed type operation to a cascade operation without evaporator shut-down for baffle dismantling and reassembly operations. A further object of the invention is to provide a system that gives the facility of a quick and simple switch between the force-feed type of operation required for viscous products, and the cascade operation which enables exploitation of a free-falling film alternatively, within an evaporator.

One advantage of the invention is that the switch from one type of operation to the other can be effected automatically by way of means which may be operated from a control panel from the evaporator.

SUMMARY OF THE INVENTION

The stated objects and advantages, and other objects and advantages besides, are realized with a multi-purpose evaporator according to the invention, which can alternate between force-feed and cascade operation, according to the characteristics of the product in process, and comprises a tube nest heat exchanger through which the product flows in a downwards direction.

An essential feature of the evaporator disclosed is that it comprises a baffle, installed permanently at the top of the tube nest, which can be engaged to drive means located exterior to the evaporator and positioned from the outside by the drive means in such a way as to provide the appropriate function when a fluid is either force fed or cascaded through the evaporator.

BRIEF DESCRIPTION OF THE DRAWINGS

Two possible embodiments of the invention will now be described in detail, by way of example, with the aid of the accompanying drawings, in which:

FIG. 2 shows a detail of FIG. 1, seen in section and on larger scale;

FIG. 3 is a further embodiment of the detail illustrated in FIG. 2.

DESCRIPTION OF THE PREFERRED EMBODIMENTS

Figure 1:
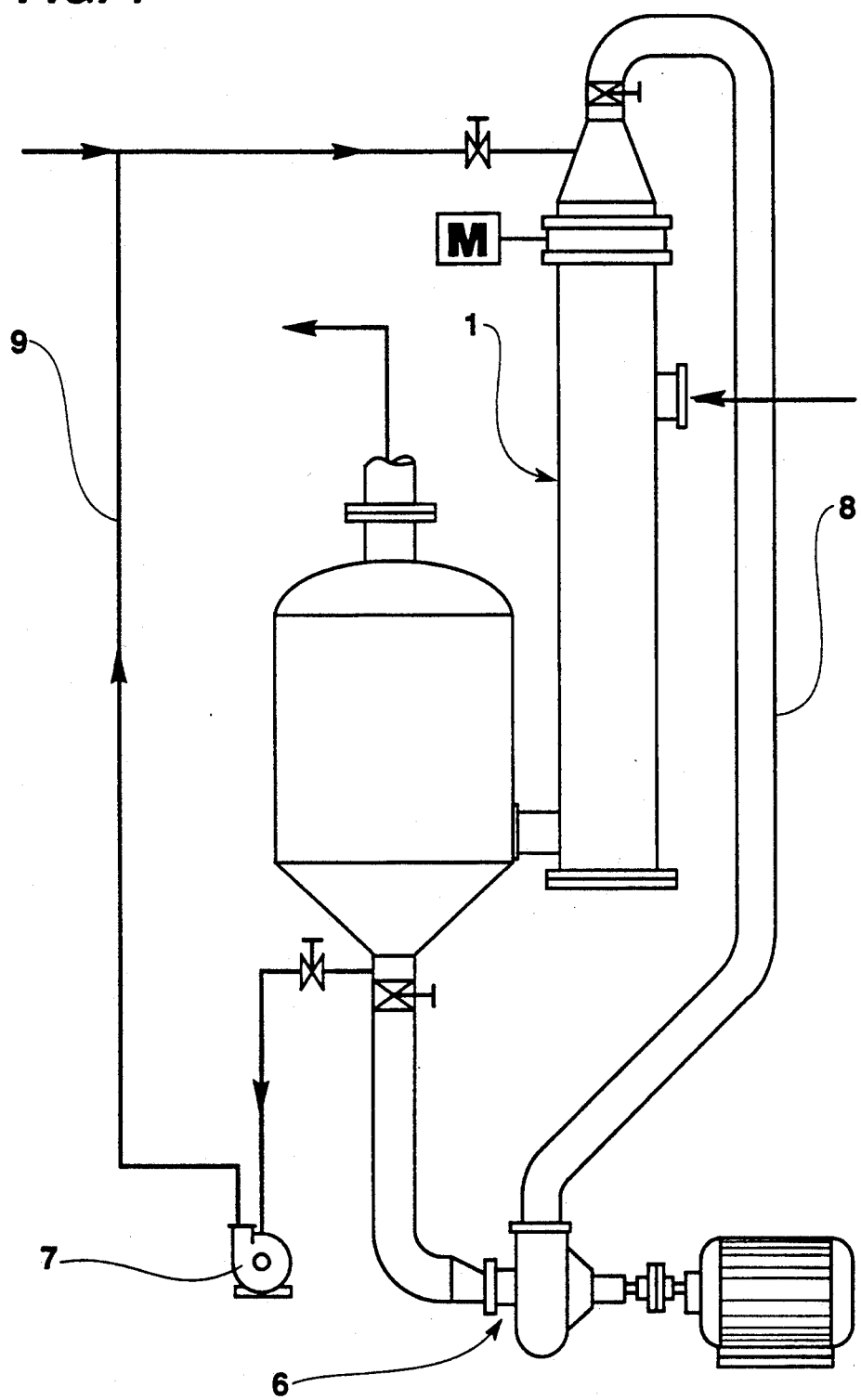
FIG. 1 is the schematic representation of a multi-purpose tube-nest evaporator circuit.

In the drawings, 1 denotes the single stage of a multi-purpose tube nest heat evaporator inside which products in liquid state or of paste consistency, such as fruit juices, foodstuffs, or chemical substances, are concentrated.

The evaporator 1 consists of a cylindrical jacket 2 that houses a tube nest 3, the tubes 4 of which are arranged parallel, with axes vertically disposed, and made fast to plates 5 located one at either end of the nest.

A product to be evaporated is directed into the tube next 3, and passes through the bores of the tubes 4; the heat necessary for evaporation will be provided normally by steam directed into the cylindrical jacket 2 and thus brought into contact with the outer surface of the tubes 4.

The evaporator is all-purpose inasmuch as it will handle particularly viscous products such as can only be circulated by force feed, the power for which is provided by a pump 6, as well as handling more fluid products; in the latter instance, a product can be evaporated to advantage by being made to cascade in a free-falling film.

The system incorporates an independent circuit for cascade operation; the pump denoted 6 is by-passed, and a further pump 7 with significantly lower rated power is installed. 8 denotes the circuit supplied by the high power pump 6, and 9 denotes the circuit supplied by the low power pump 7. The adoption of a second, independent circuit by way of which to circulate low-viscosity fluids is justified not only by the fact that less power is needed to propel the fluid through the tube nest, but also, by virtue of the fact that the flow rate of a free-falling film is significantly low, and the fluid occupies the tubes for a much shorter period of time.

In order to produce a cascading film, a baffle must be provided at the top of the tube nest 3, immediately upstream of the relative plate 5, so as to break up the flow of the product and distribute it evenly between the single tubes 4 making up the nest 3.

In the embodiment of FIG. 2, a baffle 10 is installed permanently at the top of the tube nest 3, rotatable about an axis 11 of a shaft lying at right angles both to the flow path of the fluid and to the axis of the tube nest 3 itself.

The baffle 10 is embodied in a single piece including two baffle plate portions, one on each side of the axis 11, with both plate portions lying in the same plane (FIG. 2) and functions substantially as would a butterfly valve. The baffle 10 is mounted on the axis for rotation about the axis 11 as shown in FIG. 2. 12 denotes a plurality of through holes in the baffle, the axes of which are either angled or perpendicular to the plane occupied by the baffle itself; the holes are provided in number to match the number of tubes 4 making up the nest, and arranged such as to align with the tubes whenever the baffle is in the position denoted B. It will be observed that the baffle 10 can be rotated about the aforementioned axis 11 between two limit positions denoted A and B, namely a first position where the baffle plate portions lie in a plane extending generally parallel to the axis of the tubes 4 to establish a force feed flow position and a second position where the baffle plate portions extend generally perpendicular to the axis of the tubes 4 to establish the cascade flow position shown in FIG. 2.

When in position A, the baffle 10 is disposed parallel to the flow path of a product entering the evaporator, and offers neither directional obstruction nor resistance to the flow. The position A can be considered a non-flow controlling position of the baffle 10. The baffle will be moved into position A whenever the system is operated on force-feed, utilizing the pump denoted 6 —i.e. for more viscous liquids. Rotation through 90° about the axis denoted 11 will take the baffle from position A to position B, in which the baffle 10 is disposed transverse to the flow path through the evaporator and extends substantially across the jacket. In position B, the baffle 10 checks or controls the entire flow of fluid directed into the evaporator, thereby acting as a control valve, inasmuch as flow is apportioned and directed into the single tubes 4 of the nest 3. This position B can be considered the flow controlling position of the baffle 10.

The baffle 10 will be moved into position B whenever the product in process is of a more fluid consistency, and can be cascaded in a free-falling film; in this event, the circuit denoted 9 and its relative pump 7 will be switched in, and the remaining circuit 8 and pump 6 by-passed.

The switch from force-feed operation, such as is necessary for viscous fluids, to the cascade type of operation permitted by free-flowing liquids, can be effected in markedly simple fashion; all that is required is to shut off the high power pump 6 and by-pass the relative circuit 8, whereupon the baffle 10 can be moved from position a to position b, and the low power pump 7 switched in. Rotation of the baffle might be accomplished using conventional drive components (illustrated at "M" in FIG. 1) operatively engaged to said baffle and operated from a system control panel; alternatively, a handwheel could be provided and operatively engaged to said baffle by means of which to position the baffle manually.

Where a much more viscous product is to be handled, the switch back from cascade to force-feed operation is achieved in identical fashion. Needless to say, the system will be provided with valves that by-pass the one circuit 9 when the other circuit 8 is in use, and vice-versa.

The switch from one mode of operation to the other might also be automated by interlocking start-up and shut-off of the pumps 6 and 7 to the opening and closing movements of the valves that control the relative circuits, and to the selected position of the baffle 10.

The embodiment of FIG. 3 features a baffle 13 constructed, not in a single piece, but in two sections or plate portions 14 hinged symmetrically to a shaft on a common axis 15 lying at right angles to the axis of the tube nest 3.

C and d denote the two baffle positions as envisaged for operation in force-feed and in cascade mode, depending on whether a product is viscous or free-flowing, respectively. In position C, the two sections 14 are folded one against the other full face, and disposed parallel with the flow path of fluid directed through the evaporator such that the baffle 12 remains inoperative or non-flow controlling, and offers little or no resistance to flow. It will be observed that in position D, the two sections 14 lie within a common plane disposed at right angles to the flow path, and positioned thus, will check or control the flow of fluid entering the evaporator, affording it an apportioned passage through the holes 12 into the tubes 4 beneath.

This second embodiment of the invention permits locating the baffle 13 at a short distance from the end plate 5 of the tube nest 3, and is especially advantageous where the tube nest 3 is of large diameter, since the distance separating the baffle 13 from the end plate 5 can be kept within acceptable limits.

In addition to being hinged about the same shaft axis 15, the two sections or plate portions 14 of the baffle 13 in a preferred embodiment will be constrained to rotate through the same angular distance in either direction when moving between positions C and D. Stated otherwise, the plate portions 14 are moved between a first position where the plate portions 14 are juxtaposed adjacent each other and extend in a downstream direction in generally parallel planes extending generally parallel to the axis of the tubes 4 to establish a force feed flow position and a second position where the plate portions 14 are generally coplanar and extend in a direction generally perpendicular to the axis of the tubes 4 to establish the cascade flow position.

What is claimed is:

1. A process for establishing one of two modes of operation of an evaporator, said process comprising using an evaporator including:

a generally tubular jacket;

two independent circulation circuits, one providing a force feed mode of operation and the other providing a cascade mode of operation, for introducing two different products of different viscosity into the evaporator;

and a plurality of nested heat exchange tubes disposed about a generally vertical axis and mounted within the jacket;

providing a single movable baffle;

permanently mounting said baffle on an axis generally perpendicular to the axes of the tubes at an end of said plurality of heat exchange tubes for selective movement, without evaporator, shut-down for baffle dismantling and reassembly operations, alternately between a force feed flow position where the baffle extends parallel to said plurality of heat exchange tubes for one product flow therethrough and a cascade flow position where the baffle is positioned perpendicular to the vertical heat exchange tubes for another product flow therethrough;

selectively moving the baffle according to product viscosity about said axis between the cascade flow position and the force feed flow position so as to establish a cascade mode of operation where the flow of product must be controlled or back to the force feed flow position to establish a force feed mode of operation where no control of product flow is required; said selective movement being effected automatically; and, bypassing one circulation circuit when the other is in use.

2. The process of claim 1 wherein said step of providing a single movable baffle includes providing a unitary plate and said process further includes mounting the plate for rotation about said axis generally perpendicular to the axes of the tubes.

3. The process of claim 1 wherein said step of providing said single movable baffle includes providing baffle plate portions.

4. The process of claim 3 including the step of forming the single movable baffle into plate portions integral with each other as one piece so that they lie in the same place and wherein the mounting step includes mounting the plate portions on the axis generally perpendicular to the axes of the tubes.

5. The process of claim 3 including the step of fixing the single movable baffle into plate portions together to form a unitary baffle plate and wherein said moving step includes rotating the baffle plate between the two mode positions, namely a first position where the baffle plate portions lie in a plane extending generally parallel to the axes of the tubes to establish the force feed flow position and a second position where the baffle plate portions extend generally perpendicular to the axes of the tubes to establish the cascade feed, flow position.

6. The process of claim 3 including the steps of forming said single movable baffle into two plate portions and hingedly mounting said two plate portions independently on an axis generally perpendicular to the axes of the tubes.

7. The process of claim 6 wherein said step of selectively moving the baffle includes moving the plate portions of the baffle between a first position wherein the plate portions are juxtaposed adjacent each other and extend in a downstream direction in generally parallel planes extending generally parallel to the axes of the tubes to establish the force feed flow position and a second position where the plate portions are generally coplanar and extend in a direction generally perpendicular to the axes of the tubes to establish the cascade flow position.

8. The process of claim 3 including the further steps of providing a plurality of through holes in the baffle equal in number to the number of heat exchange tubes and aligning each through-hole with the heat exchange tubes.

* * * * *